(12) United States Patent
Wilson et al.

(10) Patent No.: US 7,980,797 B2
(45) Date of Patent: Jul. 19, 2011

(54) METHOD AND APPARATUS FOR RESTRAINING CARGO ITEMS ON AN AIRCRAFT

(75) Inventors: Terry Wilson, Guthrie, OK (US);
Rebecca Hinkle, Oklahoma City, OK (US)

(73) Assignee: Arinc Incorporated, Annapolis, MD (US)

( * ) Notice: Subject to any disclaimer, the term of this patent is extended or adjusted under 35 U.S.C. 154(b) by 350 days.

(21) Appl. No.: 12/358,591

(22) Filed: Jan. 23, 2009

(65) Prior Publication Data

US 2010/0189527 A1    Jul. 29, 2010

(51) Int. Cl.
*B60P 7/08* (2006.01)

(52) U.S. Cl. ............. 410/80; 410/104; 410/105; 410/66

(58) Field of Classification Search .................. 410/104, 410/105, 66, 76, 77, 80, 82; 244/118.1, 137.1; 248/500, 503, 503.1
See application file for complete search history.

(56) References Cited

U.S. PATENT DOCUMENTS

| 7,021,596 B2 * | 4/2006 | Lory |
| 7,517,181 B2 * | 4/2009 | Dunaway et al. ............. 410/105 |

* cited by examiner

*Primary Examiner* — Stephen Gordon
(74) *Attorney, Agent, or Firm* — Ronald E. Prass, Jr.; Prass LLP

(57) ABSTRACT

A method and apparatus for restraining cargo items on an aircraft is disclosed. The apparatus may include a base that attaches to the cargo item, a lever coupled to the base, and a foot coupled to the lever, wherein the foot is placed into a seat track attached to the aircraft, the seat track having a cutout portion and a cavity beneath the cutout portion, and the lever is moved to turn the foot within the cavity to lock down the cargo item to the seat track to restrain its movement.

19 Claims, 7 Drawing Sheets

METHOD AND APPARATUS FOR RESTRAINING CARGO ITEMS ON AN AIRCRAFT

BACKGROUND OF THE DISCLOSURE

1. Field of the Disclosure

The disclosure relates to restraining cargo items in an aircraft.

2. Introduction

Many military, private, and commercial aircraft transport cargo as well as passengers and/or crew members. Restraining the cargo on board the aircraft can be challenging. Conventional aircraft restraining systems primarily include the use of tie down straps. However, securing cargo and removable avionics boxes in an aircraft using tie down straps is cumbersome, requires a footprint much larger than the cargo, and limits access to avionics, cargo boxes, and other cargo items that may be needed during flight.

SUMMARY OF THE DISCLOSURE

A method and apparatus for restraining cargo items on an aircraft is disclosed. The apparatus may include a base that attaches to the cargo item, a lever coupled to the base, and a foot coupled to the lever, wherein the foot is placed into a seat track attached to the aircraft, the seat track having a cutout portion and a cavity beneath the cutout portion, and the lever is moved to turn the foot within the cavity to lock down the cargo item to the seat track to restrain its movement.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure comprises a variety of embodiments, such as a method and apparatus and other embodiments that relate to the basic concepts of the disclosure.

The disclosed embodiments may concern a method and apparatus for restraining cargo items in an aircraft without the use of tie down straps. The system uses one or more mechanisms mounted on each corner or in the center of a cargo container to secure the cargo to the seat tracks attached to the deck of an aircraft. The seat tracks are in place on nearly all aircraft so that bench or airline-type seats may be placed in various positions on the aircraft. The disclosed embodiments use the existing seat tracks for the cargo restraining devices and the corresponding cargo restraining function.

The cargo restraining devices may include a lever attached to a "foot" similar in shape to a T-bolt, for example. The foot may be inserted into a "base" then secured to a lever. The lever may be held in place by a spring. The bottom of the base may have two round protrusions that fit into the seat track to act as stops to keep the cargo from shifting forward and backward. The foot keeps the cargo from lifting off the floor.

Figure 1:
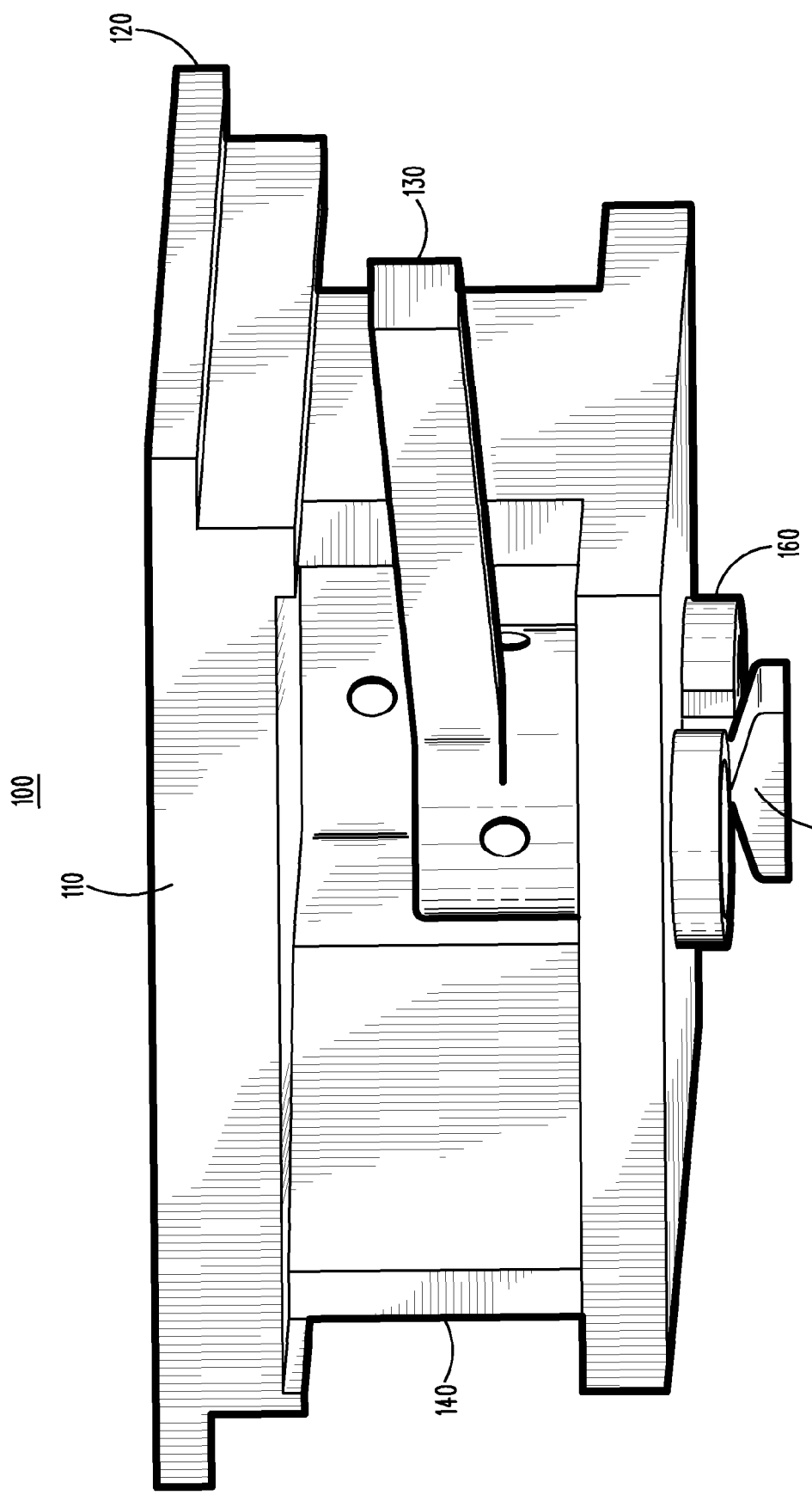
FIG. 1 is a diagram of an exemplary cargo restraining device in accordance with a possible embodiment of the disclosure.

FIG. 1 illustrates an exemplary diagram of a cargo restraining device 100 in accordance with a possible embodiment of the disclosure. The cargo restraining device 100 may include a base 140, a top portion 110 of the base 140, a lever 130, a foot 150, and one or more stops 160.

One or more cargo restraining device 100 may be used to restrain a cargo item. For example, one cargo restraining device 100 may be placed on each corner of a cargo item. The size, shape, and weight of the cargo item may dictate how many cargo restraining devices 100 are needed to restrain the cargo item. For ease of discussion, the components of the cargo restraining device 100 shown in the FIG. 1 diagram, will be discussed further in relation to the more detailed diagrams shown in FIGS. 2-6.

Figure 2:
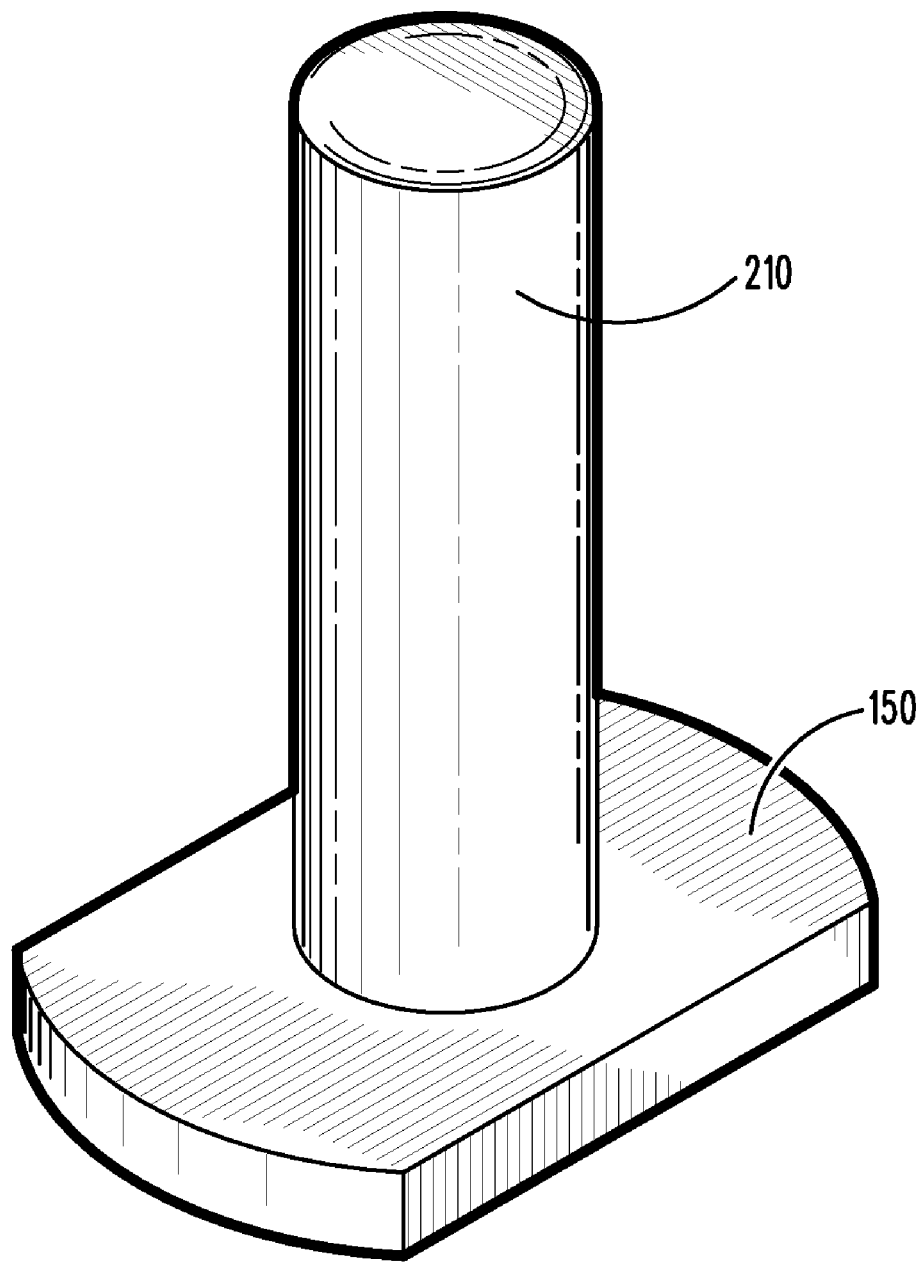
FIG. 2 is a diagram of an exemplary foot assembly of a cargo restraining device in accordance with a possible embodiment of the disclosure.

FIG. 2 is a diagram of an exemplary foot assembly 200 of a cargo restraining device 100 in accordance with a possible embodiment of the disclosure. The foot assembly 200 may include the foot 150 which may be coupled to a shaft 210. The shaft 210 may be placed through a hole in the base 140 and coupled to the lever 130, so that when the lever 130 moves, the foot 150 moves accordingly.

Figure 3:
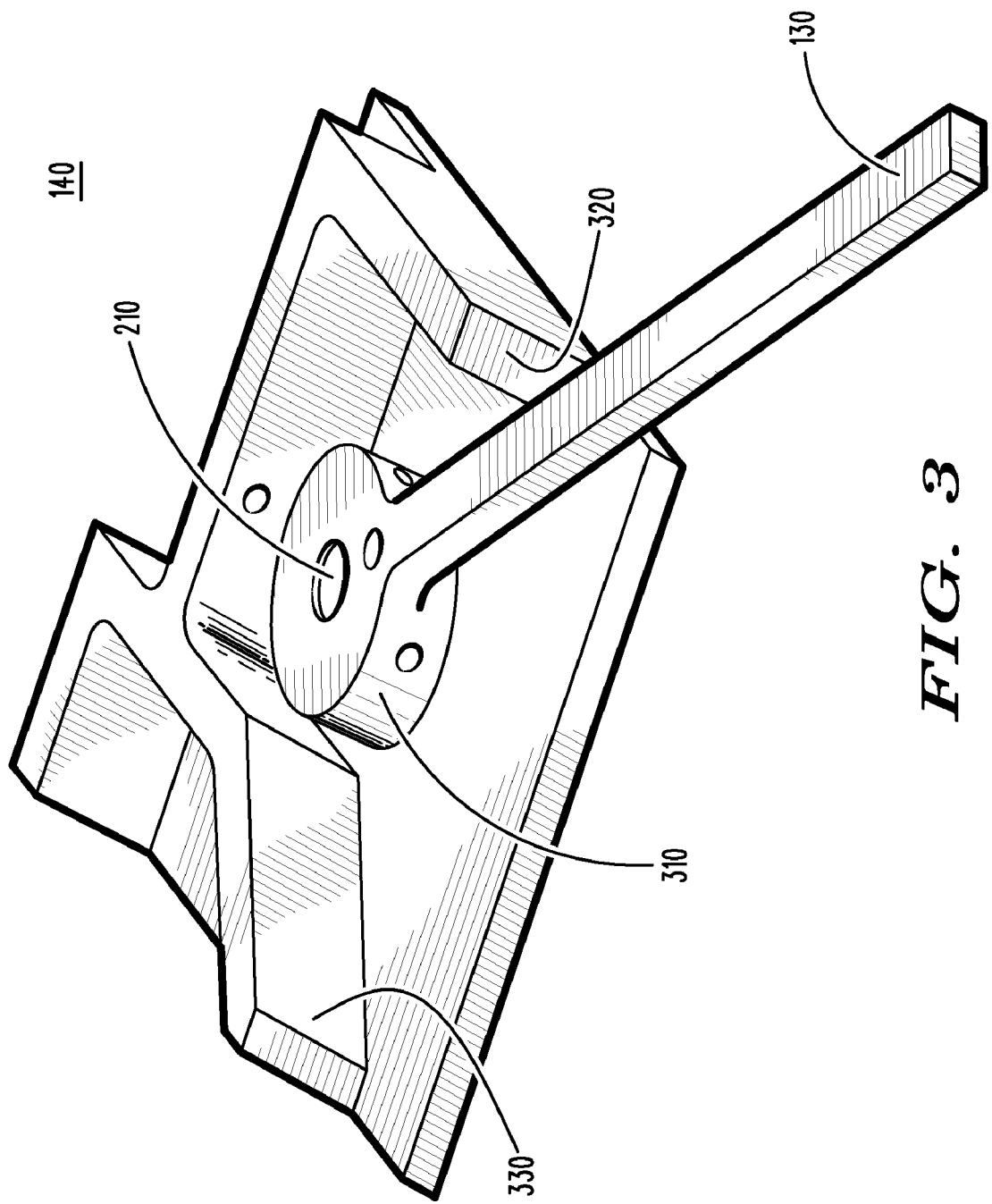
FIG. 3 is a diagram of an exemplary base of the cargo restraining device in accordance with a possible embodiment of the disclosure.

FIG. 3 is a diagram of an exemplary base 140 of the cargo restraining device 100 in accordance with a possible embodiment of the disclosure The base 140 and other components of the cargo restraining device 100 may be constructed using any durable materials, such as steel, metal alloy, composite, etc. The base 140 may include stops 320, 330 that may restrict movement of the lever 130. The hub of the lever 310 may include a locking mechanism to prevent unwanted movement of the lever 130 so that it will remain in a desired position (open or locked down, for example).

Figure 4:
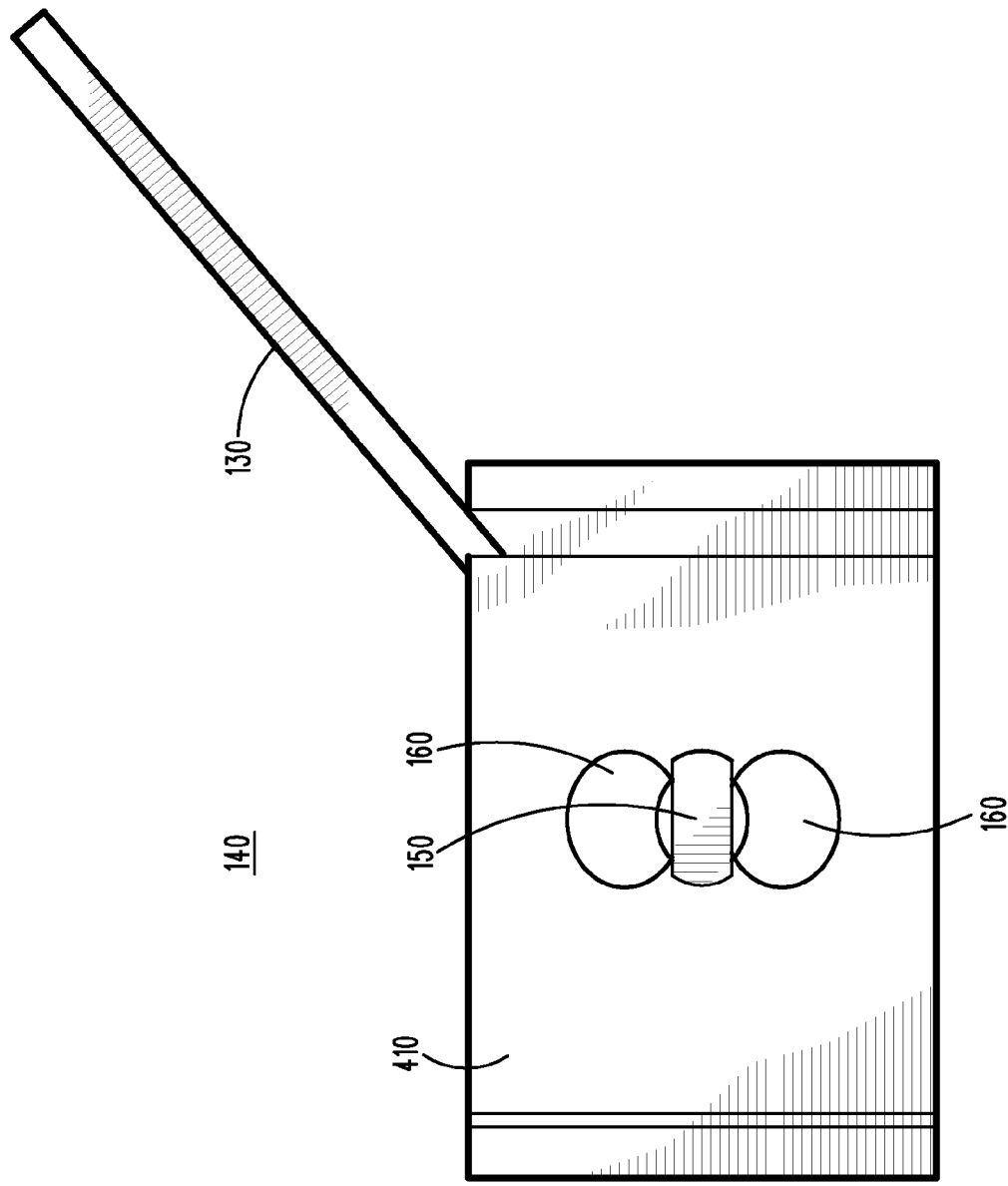
FIG. 4 is a diagram of an exemplary bottom view of the cargo restraining device base in accordance with a possible embodiment of the disclosure.

FIG. 4 is a diagram of an exemplary bottom view 410 of the cargo restraining device base 140 in accordance with a possible embodiment of the disclosure. The stops 160 are shown and as shown in FIG. 1, they are located above the foot 150. When attempting to restrain a cargo item, the stops 160 are positioned in the seat track to prevent lateral movement of the cargo item when it is locked down.

Figure 5:
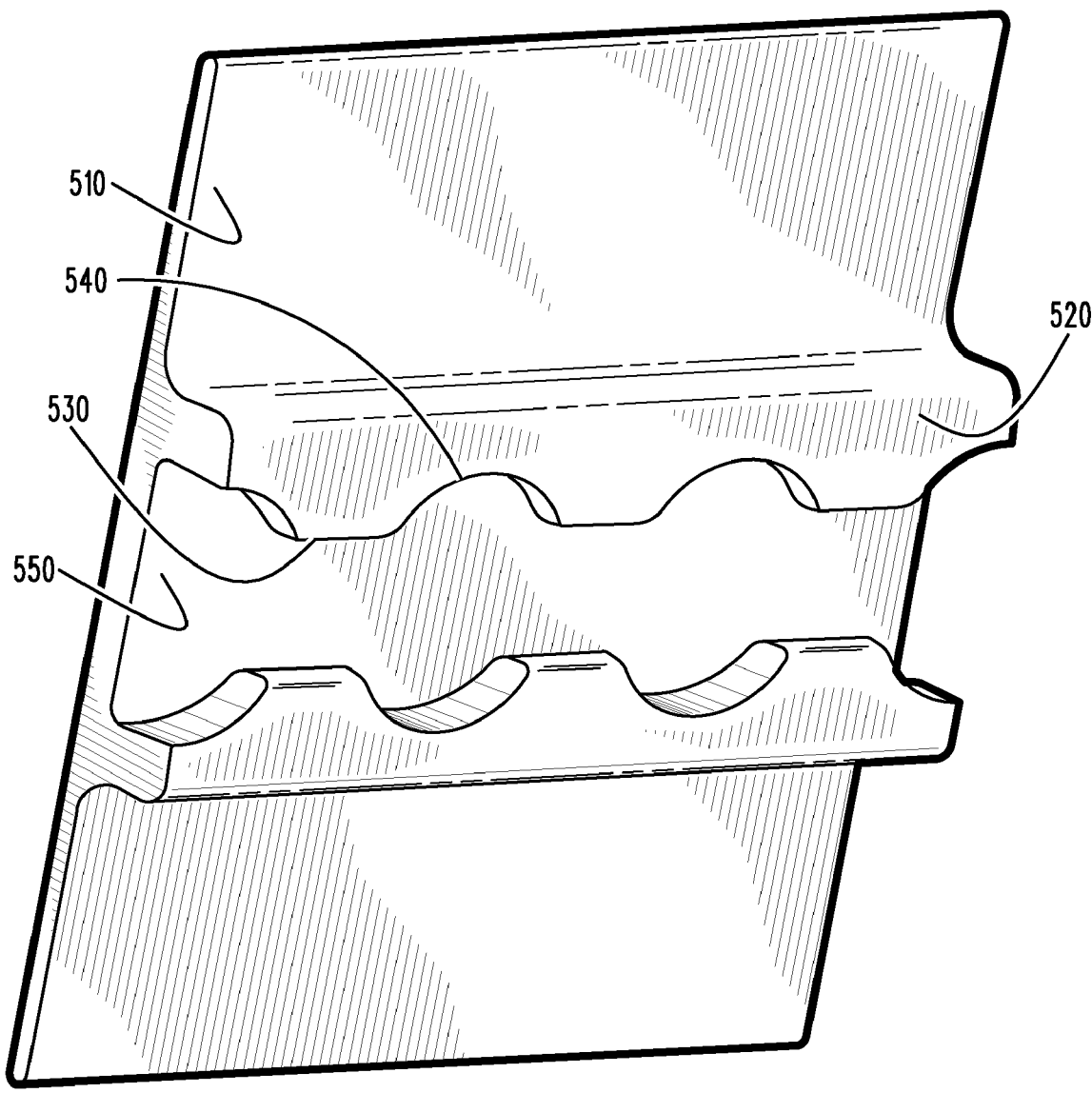
FIG. 5 is a diagram of an exemplary aircraft seat track in accordance with a possible embodiment of the disclosure.

FIG. 5 illustrates an exemplary diagram of an aircraft seat track 500 in accordance with a possible embodiment of the disclosure. Seat track 500 has a flat base portion 510 which is attached to the deck or floor (or other area) of the aircraft. The seat track 500 has raised portion 520 in the center which is cut out in a series of straight 530 and curved 540 areas. A cavity area 550 is formed from the raised portion 520 and the cutout portions 530, 540.

Figure 6:
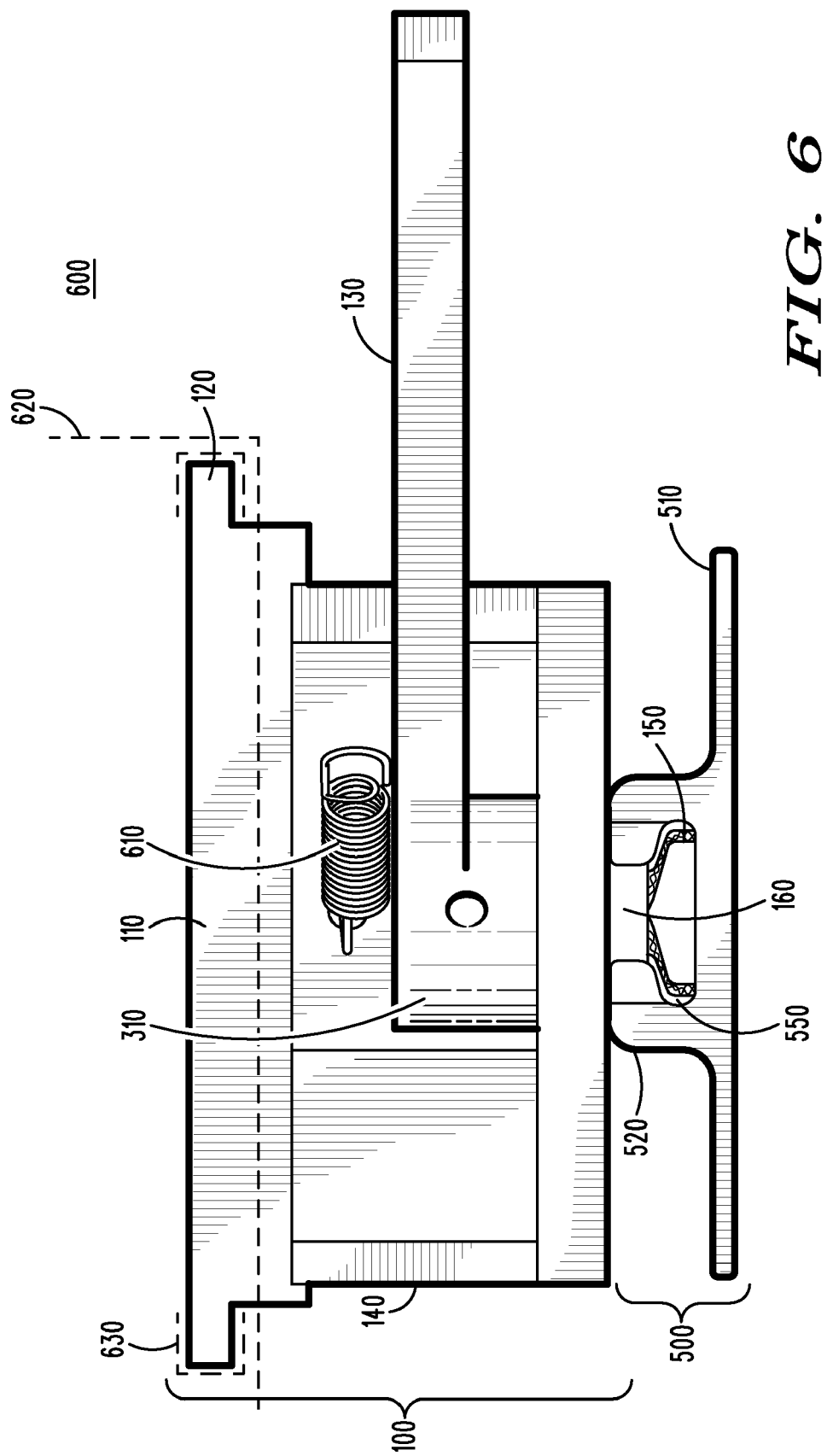
FIG. 6 is a diagram of an exemplary cargo restraining device attached to the seat track and a cargo item in accordance with a possible embodiment of the disclosure.

FIG. 6 is a diagram of an exemplary cargo restraining device 100 attached to a seat track 500 and a cargo item 620 in accordance with a possible embodiment of the disclosure. The top portion 110 of the base 140 may include flanges 120 which may be used to attach the cargo restraining device 100 to the cargo item 620. For example, the flanges 120 may slide into slots 630 at the bottom (or other location) of the cargo item 620. If the cargo item 620 used wheels to facilitate movement, the wheels may be removed (or slid off and the cargo restraining device 100 may be attached (or slid on) at the same location, for example.

The foot 150 may fit down into the straight portions 530 of the raised portion 520 in into the cavity 550. The stops 160 fit into the curved cutout portion 540 of the seat track 500. When the lever 130 is rotated with the foot 150 in the cavity 550, the foot 150 is rotated so that the raised portion 520 of the seat track 500 prevents the foot 150 (and hence, the cargo item) from being lifted out vertically. The stops 160 rest against the curved cut out portion 540 which restrict the lateral movement of the cargo item 620.

The cargo restraining device 100 may also include a spring 610 attached to the base 140 and the lever 130 to maintain the lever 130 in its open or closed (or locked) position. Thus, the spring 610 may be included as part of a locking mechanism to keep the lever in its intended position. While a spring 610 is shown, other devices which allow the lever 130 to lock in its open or closed position may be used within the spirit and scope of the invention.

For illustrative purposes, operation of the cargo restraining device 100 and the cargo restraining process will be described below in FIG. 7 in relation to the diagrams shown in FIGS. 1-6.

Figure 7:
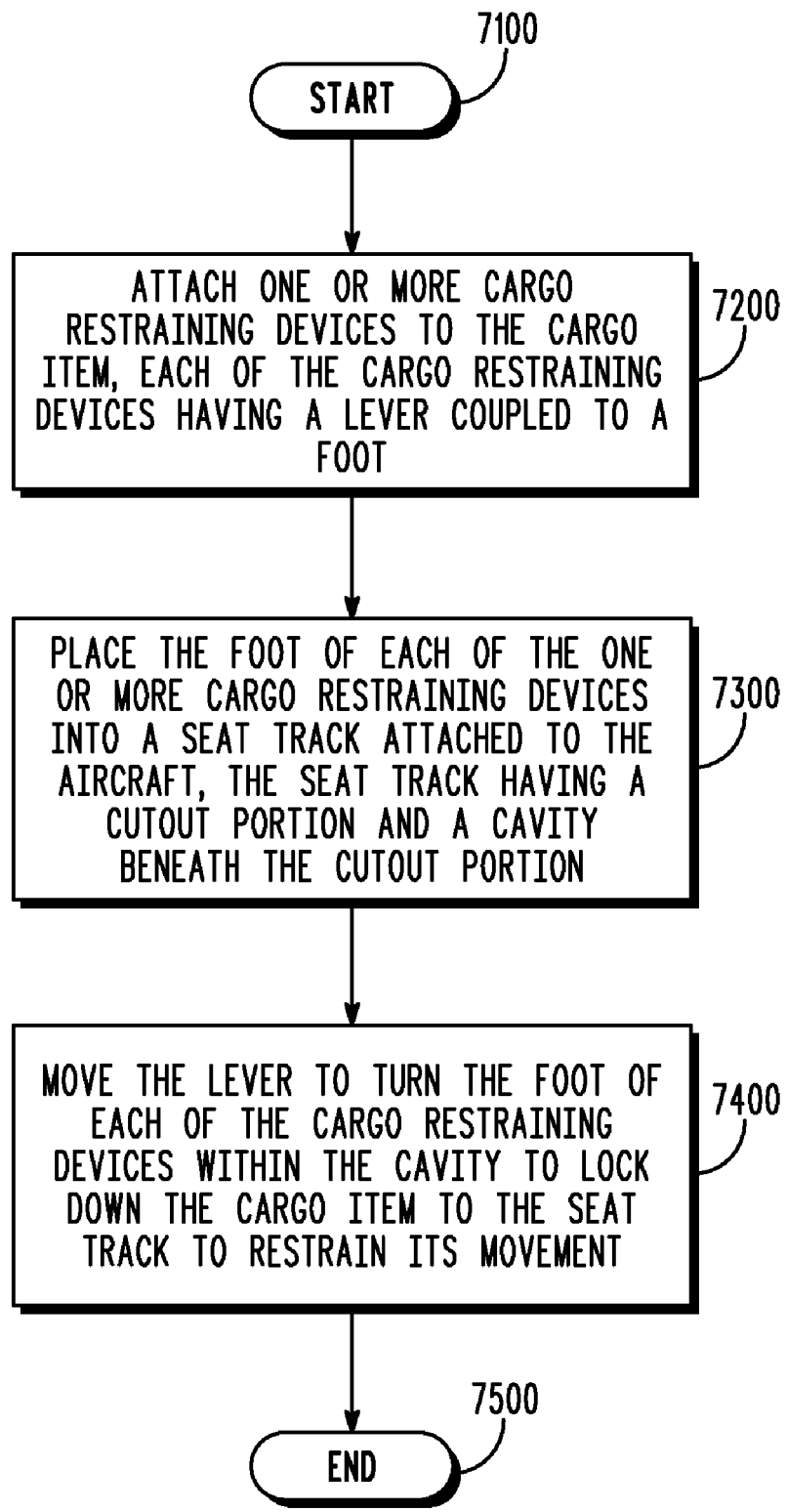
FIG. 7 is an exemplary flowchart of a cargo restraining process in accordance with a possible embodiment of the disclosure.

FIG. 7 is an exemplary flowchart illustrating the cargo restraining process in accordance with a possible embodiment of the disclosure. The process begins at step 7100 and continues to step 7200 where one or more cargo restraining devices 100 may be attached to the cargo item 620. At step 7300, the foot 150 of each of the one or more cargo restraining devices 100 may be placed in the cavity 550 of a seat track 500. At step 7400, the lever 130 of each one or more cargo restraining device 100 may be moved to turn each foot 150 within the cavity 550 so as to lock down the cargo item 620 to the seat track 500 to restrain its movement. The process may then go to step 7500 and end.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components of the disclosed embodiments each processing the content in various possible ways. It does not necessarily need to be one system used by all end users. Accordingly, the appended claims and their legal equivalents should only define the disclosure, rather than any specific examples given.

We claim:

1. An apparatus that restrains a cargo item on an aircraft, comprising:
   a base that attaches to the cargo item;
   a lever coupled to the base; and
   a foot coupled to the lever, wherein the foot is placed into a seat track attached to the aircraft, the seat track having a cutout portion and a cavity beneath the cutout portion, and the lever is moved to turn the foot within the cavity to lock down the cargo item to the seat track to restrain the cargo item's movement,
   wherein the base includes a top portion, the top portion including one or more flanges that each slide into a respective slot on the outside of the cargo item to attach the base to the cargo item.

2. The apparatus of claim 1, wherein the cargo item contains one or more wheels in each of the respective slots to facilitate movement of the cargo item, the one or more wheels being removed from the respective slots on the outside of the cargo item so that each of the one or more flanges may be placed in a respective slot.

3. An apparatus that restrains a cargo item on an aircraft, comprising:
   a base that attaches to the cargo item;
   a lever coupled to the base; and
   a foot coupled to the lever, wherein the foot is placed into a seat track attached to the aircraft, the seat track having a cutout portion and a cavity beneath the cutout portion, and the lever is moved to turn the foot within the cavity to lock down the cargo item to the seat track to restrain the cargo item's movement; and
   a locking mechanism that locks the lever into a position where the foot has been turned within the cavity of the seat track so as to lock down the cargo item to the seat track, wherein the locking mechanism includes a spring that is coupled to the base and the lever.

4. The apparatus of claim 1, further comprising:
   one or more stops that contact a top portion of the seat track to restrict lateral movement of the cargo item.

5. The apparatus of claim 1, further comprising:
   a shaft that is coupled to the foot, the shaft being threaded through a hole in the base and is coupled to the lever.

6. The apparatus of claim 1, wherein the base includes one or more stops that restrict movement of the lever.

7. A method of restraining a cargo item on an aircraft, comprising:
   attaching one or more cargo restraining devices to the cargo item by sliding each of one or more flanges on each of the one or more cargo restraining devices into a respective slot on the outside of the cargo item, each of the one or more cargo restraining devices having a lever coupled to a foot;
   placing the foot of each of the one or more cargo restraining devices into a seat track attached to the aircraft, the seat track having a cutout portion and a cavity beneath the cutout portion; and
   moving the lever of each of the one or more cargo restraining devices to turn the foot of each of the one or more cargo restraining devices within the cavity of the seat track to lock down the cargo item to the seat track to restrain the cargo item's movement.

8. The method of claim 7, further comprising:
removing one or more wheels from the cargo item, wherein the one or more flanges each slide into a respective slot on the outside of the cargo item that housed the one or more wheels to facilitate movement of the cargo item.

9. A method of restraining a cargo item on an aircraft, comprising:
attaching one or more cargo restraining devices to the cargo item, each of the one or more cargo restraining devices having a lever coupled to a foot;
placing the foot of each of the one or more cargo restraining devices into a seat track attached to the aircraft, the seat track having a cutout portion and a cavity beneath the cutout portion; and
moving the lever of each of the one or more cargo restraining devices to turn the foot of each of the one or more cargo restraining devices within the cavity of the seat track to lock down the cargo item to the seat track to restrain the cargo item's movement,
wherein a locking mechanism locks the lever into a position where the foot has been turned within the cavity of the seat track so as to lock down the cargo item to the seat track, the locking mechanism including a spring coupled to the lever and a base that locks the lever into a position to prevent inadvertent release from the seat track.

10. The method of claim 7, wherein each of the cargo restraining devices includes one or more stops that contact a top portion of the seat track to restrict lateral movement of the cargo item.

11. The method of claim 7, wherein each of the one or more cargo restraining devices includes a shaft that is coupled to the foot, the shaft being threaded through a hole in each of the one or more cargo restraining devices and is coupled to the lever.

12. The method of claim 7, wherein each of the one or more cargo restraining devices includes one or more stops that restrict movement of the lever.

13. The method of claim 7, wherein each of the one or more cargo restraining devices is a portion of the cargo item.

14. An apparatus that restrains a cargo item on an aircraft, comprising:
a base that attaches to the cargo item, wherein the base includes a top portion, the top portion including one or more flanges that each slide into a respective slot on the outside of the cargo item to attach the base to the cargo item;
a lever coupled to the base;
a foot coupled to the lever, wherein the foot is placed into a seat track attached to the aircraft, the seat track having a cutout portion and a cavity beneath the cutout portion, and the lever is moved to turn the foot within the cavity so as to lock down the cargo item to the seat track to restrain the cargo item's movement;
one or more stops that contact a top portion of the seat track to restrict lateral movement of the cargo item;
a shaft that is coupled to the foot, the shaft being threaded through a hole in the base and is coupled to the lever; and
a locking mechanism that locks the lever into a position where the foot has been turned within the cavity of the seat track so as to lock down the cargo item to the seat track.

15. The apparatus of claim 14, wherein the cargo item contains one or more wheels in each of the respective slots to facilitate movement of the cargo item, the wheels being removed from the respective slots on the outside of the cargo item so that each of the one or more flanges may be placed in a respective slot.

16. The apparatus of claim 3, further comprising:
one or more stops that contact a top portion of the seat track to restrict lateral movement of the cargo item.

17. The apparatus of claim 3, further comprising:
a shaft that is coupled to the foot, the shaft being threaded through a hole in the base and is coupled to the lever.

18. The apparatus of claim 3, wherein the base includes one or more stops that restrict movement of the lever.

19. The apparatus of claim 14, wherein the base includes one or more stops that restrict movement of the lever.

* * * * *